Sept. 12, 1950  R. GOLDBERG  2,521,910
COMBINED DIE AND HEADLESS
SCREW AND BOLT DEVICE
Filed May 7, 1946
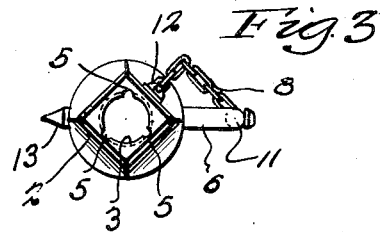
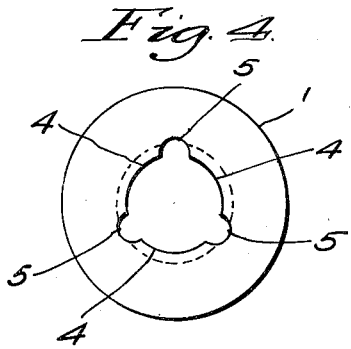
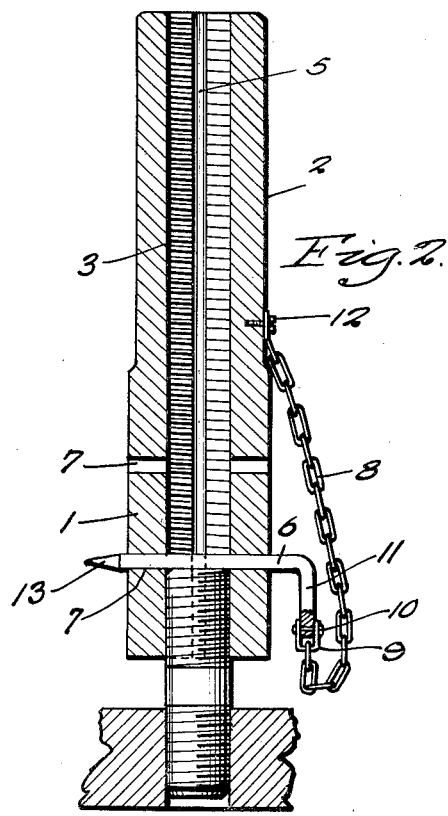
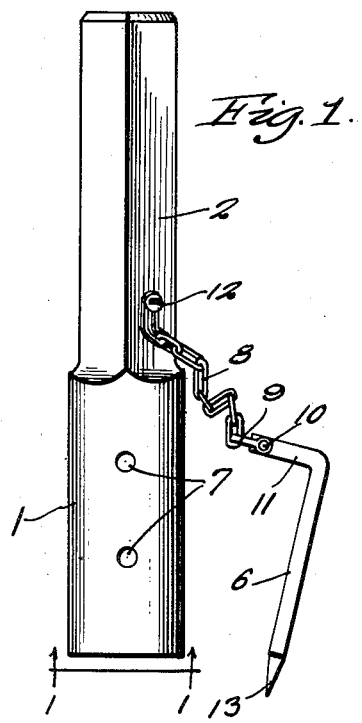
Inventor
RALPH GOLDBERG
By Clarence A. O'Brien
and Harvey B. Jackson
Attorneys Patented Sept. 12, 1950

2,521,910

UNITED STATES PATENT OFFICE 2,521,910

COMBINED DIE AND HEADLESS SCREW AND BOLT DEVICE

Ralph Goldberg, Baltimore, Md., assignor of one-half to Joseph H. Colvin, Baltimore, Md.

Application May 7, 1946, Serial No. 667,987

1 Claim. (Cl. 10—118)

This invention relates to improvements in combination die and headless screw and bolt devices.

An object of the invention is to provide an improved combination die and headless screw and bolt tool which may be used for threading headless screws or bolts into suitably threaded openings in metal objects, or into a pilot opening in wood objects.

Another object of the invention is to provide an improved tool formed with a combined die and associated means for repairing mutilated threads and for inserting or installing headless screws and bolts into suitable openings.

A further object of the invention is to provide an improved combination die and headless screw and bolt device with means for engaging a headless screw or bolt for inserting or installing the same in an opening, and means including a square shank formed on said device adapted to be engaged by a wrench for rotating the same.

Another object of the invention is to provide an improved tool including a combination die and headless screw and bolt inserting or installing device, said tool being highly efficient in operation and relatively inexpensive to manufacture and produce.

Other objects will appear as the description proceeds.

In the accompanying drawings which form a part of this application,

Figure 1 is a side elevation of the improved combination die and headless screw and bolt device;

Figure 2 is a vertical sectional view through the device with a headless bolt shown being installed in a threaded opening;

Figure 3 is a top view of the improved device, and

Figure 4 is a view on the line 4—4 of Figure 1.

Like characters of reference are used throughout the following specification and the accompanying drawings to designate corresponding parts.

In carrying out the invention, there is provided a tool having a round, lower body portion 1 merging into a reduced square shank portion 2 at its upper end.

The tool is formed with a centrally disposed threaded bore 3 extending throughout its length for receiving the threaded upper ends of headless screws and bolts for inserting or installing them in suitably threaded openings or into pilot openings when inserting or installing a headless screw.

The internally threaded bore 3 is formed with the three arcuate evenly spaced cooperating die cutting teeth 4, the same being separated by the slots or notches 5 extending the full length of the tool, whereby when a headless bolt or screw is threaded by hand into said threaded bore 3, should there be a mutilated thread on said bolt or screw, the same may be repaired or corrected in the following manner.

The lower end of the damaged bolt or screw will be threaded into the lower threaded end of the tool 1 as far as possible until the mutilated or damaged thread is engaged by the die teeth. The headless bolt or screw is placed or threaded into the threaded opening and the tool is continued to be rotated. As the bolt or screw meets greater resistance in the hole, the die installation tool will turn on the other end of the bolt or screw because the damaged threads offer lesser resistance to the installation tool. This process will be repeated or continued until the threaded end of the bolt or screw comes to seat against the hardened pin 6 positioned through one of the spaced transversely extending opening 7 formed through the lower end of the said tool 1.

A chain 8 will be connected to the link 9 pivoted on the pin 10 extending through the angularly bent outer end 11 of the pin 6 and its opposite end will be secured to the body 2 of the tool by means of the screw 12. The outer end of the pin 6 will be pointed as at 13 to facilitate inserting it into and through either transverse opening 7.

From the foregoing description, it will be understood that the square shank portion 2 has been provided for engagement by suitable wrench (not shown), and when the die is being used for threading, the cross pin 6 will be left out of the transverse opening 7 to hang by the connecting chain 8.

It is intended that the tool be adapted to form threads on a blank stud, bolt or nipple, as well as for straightening mutilated threads, the die being used in the customary manner. The die is also capable of forming threads on the exterior of long blank rods or shafts, the rods or shafts being movable through the body of the tool as the threads are being formed.

It will, therefore, be apparent from the foregoing description that there has been provided a highly efficient form of tool including a combination die and means for installing headless screws and bolts, and for straightening damaged threads thereon.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

A device of the character described comprising a tool body having a threaded bore formed therethrough, spaced circumferentially extending cutting clearing grooves formed throughout the full length of said tool forming equally spaced die thread cutting members, the upper end of said tool body being reduced and squared to provide a wrench supporting shank, the lower end of said body being formed with vertically spaced, transversely extending bores, and a pin tethered to said body selectively receivable in said bores for limiting the upward movement of a threaded bolt or stud when inserted within the lower end of said tool body.

RALPH GOLDBERG.

REFERENCES CITED

The following references are of record in the file of this patent:

UNITED STATES PATENTS

| Number | Name | Date |
|---|---|---|
| 1,199,084 | Kraft | Sept. 26, 1916 |
| 1,395,939 | Barnes et al. | Nov. 1, 1921 |
| 1,465,337 | Binford | Aug. 21, 1923 |
| 1,549,041 | Berg | Aug. 11, 1925 |
| 1,566,691 | Perry | Dec. 22, 1925 |